(12) United States Patent
Buchholz et al.

(10) Patent No.: US 9,050,572 B2
(45) Date of Patent: Jun. 9, 2015

(54) PROCESS FOR THE PRODUCTION OF CARBON NANOTUBES IN A FLUIDIZED BED

(75) Inventors: Sigurd Buchholz, Köln (DE); Maziar Kakhi, Potomac, MD (US); Volker Michele, Köln (DE); Leslaw Mleczko, Dormagen (DE); Christian Münnich, Leverkusen (DE); Reiner Rudolf, Leverkusen (DE); Aurel Wolf, Wülfrath (DE)

(73) Assignee: Bayer Materialscience AG, Leverkusen (DE)

( * ) Notice: Subject to any disclaimer, the term of this patent is extended or adjusted under 35 U.S.C. 154(b) by 1427 days.

(21) Appl. No.: 11/735,023

(22) Filed: Apr. 13, 2007

(65) Prior Publication Data

US 2008/0003170 A1 Jan. 3, 2008

(30) Foreign Application Priority Data

Apr. 15, 2006 (DE) .................... 10 2006 017 695

(51) Int. Cl.
*B01J 3/06* (2006.01)
*C01B 31/06* (2006.01)
*B01J 3/08* (2006.01)
*B01J 8/18* (2006.01)
*B01J 8/24* (2006.01)
*B82Y 30/00* (2011.01)
*B82Y 40/00* (2011.01)
*C01B 31/02* (2006.01)

(52) U.S. Cl.
CPC .... *B01J 8/18* (2013.01); *B01J 8/24* (2013.01); *B01J 2208/00548* (2013.01); *B01J 2208/00575* (2013.01); *B01J 2208/00584* (2013.01); *B01J 2208/00672* (2013.10); *B01J 2208/00681* (2013.01); *B01J 2208/00725* (2013.01); *B82Y 30/00* (2013.01); *B82Y 40/00* (2013.01); *C01B 31/0233* (2013.01); *C01B 2202/36* (2013.01)

(58) Field of Classification Search
USPC ................................ 423/447.3; 977/843, 845
See application file for complete search history.

(56) References Cited

U.S. PATENT DOCUMENTS 4,767,737 A 8/1988 Brooks
6,358,878 B1 3/2002 Moy et al.
(Continued)

FOREIGN PATENT DOCUMENTS

CA 2374848 A1 9/2003
CN 1443708 9/2003
(Continued)

OTHER PUBLICATIONS

Kunii et al., "Chapter 3: Fluidization and Mapping of Regimes," 1991, Fluidization Engineering, Second Edition, Butterworth-Heinemann Series in Chemical Engineering, pp. 61-94.*
(Continued)

*Primary Examiner* — Guinever Gregorio
(74) *Attorney, Agent, or Firm* — Norris McLaughlin & Marcus, P.A.

(57) ABSTRACT

The present invention relates to a process for the production of carbon nanotubes by decomposition of hydrocarbons on a heterogeneous catalyst in a fluidized bed reactor, wherein the reactor can be operated batchwise or continuously, and in the case of continuous operation discharge can take place with sifting or without sifting.

5 Claims, 1 Drawing Sheet

(56) References Cited

U.S. PATENT DOCUMENTS

| | | |
|---|---|---|
| 6,518,218 B1 | 2/2003 | Sun et al. |
| 2004/0000697 A1* | 1/2004 | Setoguchi et al. ............ 257/432 |
| 2004/0151654 A1* | 8/2004 | Wei et al. .................... 423/447.3 |
| 2005/0074392 A1* | 4/2005 | Yang et al. ................. 423/447.3 |
| 2006/0086834 A1* | 4/2006 | Pfeffer et al. ..................... 241/5 |

FOREIGN PATENT DOCUMENTS

| | | |
|---|---|---|
| EP | 1399384 A2 | 1/2003 |
| EP | 1375424 A1 | 1/2004 |
| EP | 1391425 A1 | 2/2004 |
| WO | 86 03455 A1 | 6/1986 |
| WO | 90 07023 A1 | 6/1990 |
| WO | 03 004410 A1 | 1/2003 |

OTHER PUBLICATIONS

Wen et al., "A Generalized Method for Predicting the Minimum Fluidization Velocity," 1966, A.I.Ch.E. Journal, vol. 12, Issue 3, pp. 610-612.*

Wang, Yao; et al: "Agglomerated carbon nanotubes and its mass production in a fluidized-bed reactor"; Physica B, 323, pp. 327-329, (2000) Amsterdam, NL.

Venegoni, et al: "Parametric study for the growth of carbon nanotubes by catalytic chemical vapor deposition in a fluidized bed reactor"; Carbon 40, pp. 1799-1807, 2002.

Wang, et al: "Fluidization and agglomerate structure of $SiO_2$ nanoparticles" Powder Technology 124, pp. 152-159 (2002), Elsevier Sequoia Lausanne, CH, 2002.

Partial English-language translation of Chinese Article entitled "Chemistry and Catalytic Reaction Engineering", edited by Li Shaofen, Chemical Industry Press, published May 31, 1986, pp. 293-300 (12 pages total).

Carbon Nanofibers: Catalytic Synthesis and Application; Krijn P. De Jong, et al.; Catal. Rev.-Sci. Eng., 42(4), pp. 481-510 (2000).

Fluidised-bed CVD synthesis of carbon nanotubes on $Fe_2O_3$/MgO; Ph. Mauron, et al., Diamond and related Materials 12, pp. 780-785 (2002).

Carbon nanotubes produced by fluidized bed catalytic CVD: first approach of the process; M. Corrias, et al., Chemical Engineering Science 58, pp. 4475-4482 (2003).

Agglomerated CNTs synthesized in a fluidized bed reactor: Agglomerate structure and formation mechanism; Yu Hao, et al., Carbon 41, pp. 2855-2863 (2003).

An efficient numerical technique for solving population balance equation involving aggregation, breakage, growth and nucleation; Jitendra Kumar, et al., Power Technology 182, pp. 81-104 (2007).

* cited by examiner

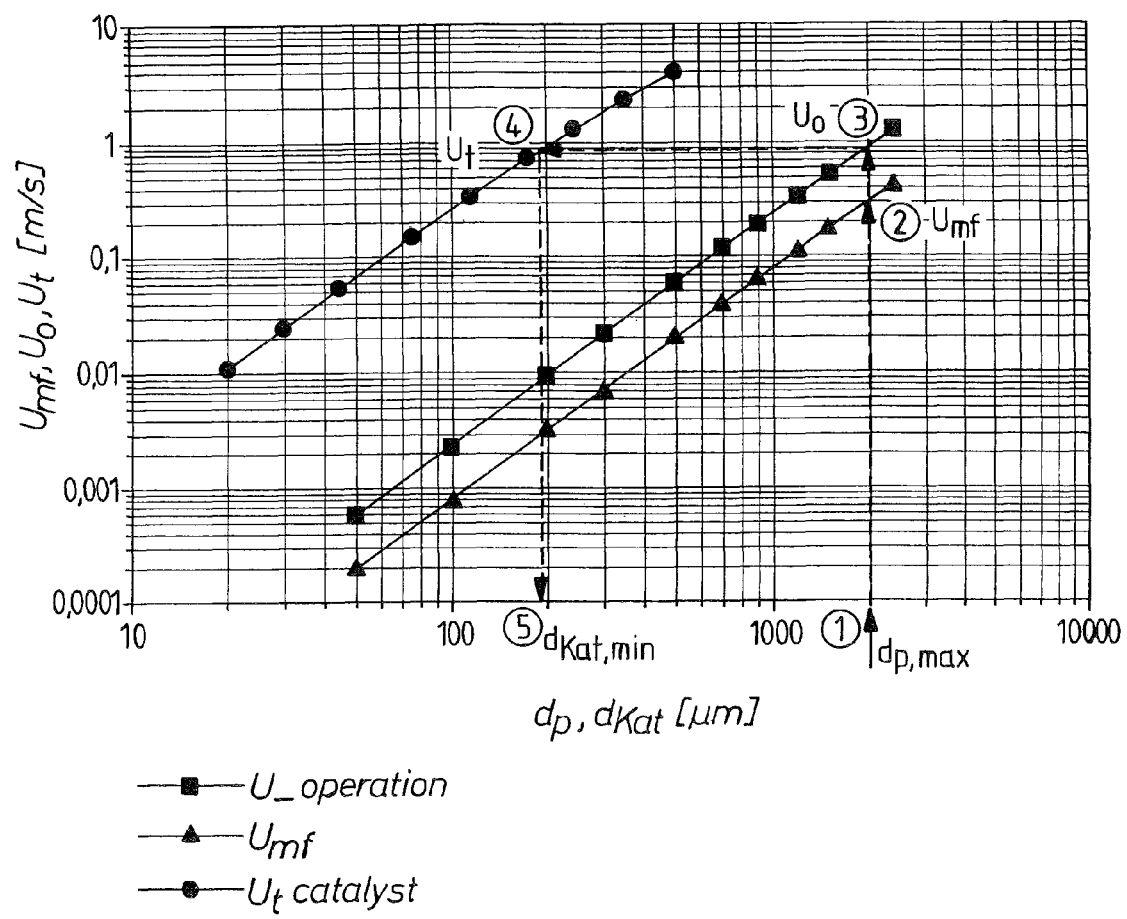

PROCESS FOR THE PRODUCTION OF CARBON NANOTUBES IN A FLUIDIZED BED

The present invention relates to a process for the production of carbon nanotubes by decomposition of hydrocarbons on a heterogeneous catalyst in a fluidized bed reactor, wherein the reactor can be operated batchwise or continuously, and in the case of continuous operation discharge can take place with sifting or without sifting.

Carbon nanotubes here are understood as meaning cylindrical carbon tubes having a diameter of between 3-150 nm, preferably 3 and 80 nm, the length being several times, at least 100 times, the diameter. These tubes are made up of layers of ordered carbon atoms and have a core of different morphology. These carbon nanotubes are also called, for example, carbon fibrils or hollow carbon fibres. Because of their dimensions and their particular properties, the carbon nanotubes described are of industrial importance for the production of composite materials. Essential farther possibilities lie in electronic uses, energy uses and fiber uses.

The production of carbon nanotubes having diameters of less than 100 nm is also described, inter alia, in WO A 86/03455 A1. Light (i.e. short- and mediun-chain aliphatic or mono- or dinuclear aromatic) hydrocarbons and a catalyst based on iron, on which carbon supports are decomposed at temperatures above 800-900° C., are described here for the production. The known methods include, for example, arc, laser ablation and catalytic methods. In many of these methods, carbon black amorphous carbon and fibres having large diameters are formed as by-products. In the catalytic processes, a distinction may be made between deposition on supported catalyst particles and deposition on metal centres formed in situ and having diameters in the nanometer range (so-called flow process). In the case of production via catalytic deposition of carbon from hydrocarbons which are gaseous under the reaction conditions (in the following CCVD; catalytic chemical vapour deposition), acetylene, methane, ethane, ethylene, butane, butene, butadiene, benzene and further carbon-containing educts are mentioned as possible carbon donors. The catalysts as a rule comprise metals, metal oxides or decomposable or reducible metal components. For example, Fe, Mo, Ni, V, Mn, Sn, Co, Cu and others are mentioned as metals in the prior art. The individual metals usually indeed have a tendency to form nanotubes, but according to the prior art high yields and low contents of amorphous carbons are advantageously achieved with metal catalysts which comprise a combination of the abovementioned metals. According to the prior art, particularly advantageous systems are based on combinations which comprise Fe or Ni. The formation of carbon nanotubes and the properties of the tubes formed depend in a complex manner on the metal component used as the catalyst or a combination of several metal components, the support material used and the interaction between the catalyst and support, the educt gas and its partial pressure, admixing of hydrogen or further gases, the reaction temperature and the dwell time and the reactor used. Optimization of the production process is a particular challenge for an industrial process.

The metal component used in CCVD and called a catalyst is consumed in the course of the synthesis process. This consumption is to be attributed to a deactivation of the metal component, e.g. due to deposition of carbon on the entire particle, which leads to complete covering of the particle (this is known to the person skilled in the art as encapping). Reactivation as a rule is not possible or does not make economic sense. Often only a few grams of carbon nanotubes are obtained per gram of catalyst, the catalyst here including the entirety of support and catalyst used. Because of the consumption of catalyst described, a high yield of carbon nanotubes based on the catalyst employed is a substantial requirement of the catalyst and process.

For industrial production of carbon nanotubes, e.g. as a constituent for improving the mechanical properties or conductivity of composite materials, as with all industrial processes a high space/time yield is to be aimed for, while retaining the particular properties of the nanotubes and minimizing the energy and operating materials to be used. Various processes described in the literature for the production of carbon nanotubes by CCVD indeed show the suitability in principle of various catalysts, but often have only a low productivity.

Various processes and catalysts are known for the production of carbon nanotubes. An overview of production methods is given, for example, by Geus and DeJong in a review article (K. P. De Jong and J. W. Geus in Catal. Rev.-Sci. Eng., 42(4), 2000, pages 481-510). Either pure metals or combinations of various metals can be employed, as described e.g. in WO 03/004410 A1, U.S. Pat. No. 6,358,878, U.S. Pat. No. 6,518, 218, CN 1443708.

A number of works are dedicated to the production of carbon nanotubes by means of CCVD in a fluidized bed. In CA 2374848 A1, a process in which a yield of 3 g of CNTs/g of catalyst is achieved with acetylene as the carbon donor on a cobalt catalyst is described as a possible fluidized bed process for mass production of carbon nanotubes. This comparatively very low yield makes the process seem non-critical in respect of ensuring the fluidization, but necessitates involved purification steps in order to obtain a product which is suitable for the use.

Only very low yields (max. 0.35 g of CNTs/g of catalyst) are likewise achieved by Mauron et al. (Ph. Mauron et al. "Fluidised-bed CVD synthesis of carbon nanotubes on $Fe_2O_3$/MgO", Diamond and Related Materials 12 (2003) 780-785) in the production of CNTs from iso-pentane or acetylene on an iron catalyst in a fluidized bed reactor on the laboratory scale.

EP 1399384 A2 describes the production of carbon nanotubes in a fluidized bed preceded by a reactor for in-line catalyst production, wherein the catalyst can have an average particle size of between 10 µm and 1,000 µm, and a growth in the volume of the agglomerates of up to twenty times the amount of catalyst can be achieved.

Venegoni et al. (D. Venegoni, et al. "Parametric study for the growth of carbon nanotubes by catalytic chemical vapor deposition in a fluidized bed reactor", Carbon 40 (2002) 1799-1807) likewise describe the production of CNTs in a laboratory fluidized bed. With ethylene as the carbon donor, however, the iron catalyst employed delivers only a very low yield of a maximum of 50%, based on the weight of catalyst employed.

EP 1375424 A1 describes the production of carbon nanotubes on a catalyst of iron, nickel or cobalt, wherein to ensure the fluidization in the reactor, suitable particles are added as an additional fluidization auxiliary (powder-particle bed). However, this results in a reduced space/time yield of the process and necessitates involved separating off and retention of the fluidization auxiliary.

WO 90/07023 A1 describes the production of carbon nanotubes in a fluidized bed on catalysts which comprise iron, molybdenum, cobalt, nickel, platinum, vanadium or chromium or combinations of these elements. In this context, yields of between 30 and 200 g of CNTs/g of catalyst metal are described; however, based on the entire catalyst including support material, the yield is low. In respect of the catalyst particle size fraction to be employed, preferred ranges of between 50 μm and 300 μm are mentioned, but without systematic justification and more detailed limitation in respect of maintaining fluidization during the growth of the CNT agglomerates.

Corrias et al. (M. Corrias et al., "Carbon nanotubes produced by fluidized bed catalytic CVD: first approach of the process", Chemical Engineering Science 58 (2003) 4475-4482) observe in their experiments with an iron catalyst in a fluidized bed reactor on the laboratory scale in batchwise operation an increase in the minimum fluidization speed from the start of the experiment (pure catalyst) to the end of the experiment (CNT agglomerates) of 20%.

Hao et al. (Y. Hao et al., "Agglomerated CNTs synthesized in a fluidized bed reactor: Agglomerate structure and formation mechanism", Carbon 41 (2003) 2855-2863) describe fluidized bed experiments with a catalyst based on iron and molybdenum, the average external diameter increasing from 100 μm to 500 μm and the bulk density decreasing from 1,100 $kg/m^3$ to 40 $kg/m^3$ during the experiments.

EP 1391425 A1 describes the production of carbon nanotubes in a fluidized bed, wherein the external diameter in the bed (catalyst and CNT agglomerates) varies between 1 μm and 1,000 μm and the bulk density varies between 20 $kg/m^3$ and 800 $kg/m^3$, the spread of the particle properties relevant for the fluidization thus being even greater.

Summarizing, the processes incl. catalysts described in the prior art offer no systematic strategies for ensuring reliably, and suitably for scaled transfer, fluidization in the fluidized bed processes with catalysts which are effective in such a manner. In the case of a long life of the catalyst before deactivation, i.e. by encapsulation with amorphous carbon, the CNTs formed in the fluidized bed become very long and the agglomerates very large, so that a conflict arises between maintaining the fluidization of the large agglomerates and discharge of the fine catalyst particles.

The object of the present invention was therefore to develop a process for the production of multilayered carbon nanotubes having diameters of from 3 to 150 nm, preferably 3 to 80 nm, and an aspect ratio of L:D>100 (ratio of diameter to lateral extension) in a fluidized bed which allows trouble- and interruption-free operation of the installation with the highest possible product yield. In particular, the process according to the invention should reliably suppress defluidization of the contents of the reactor due to carbon nanotube agglomerates which grow too large, such as can occur with a high yield when optimized catalysts are employed. A further requirement of the process was its realization on a production scale.

Surprisingly, the object was achieved in the process according to the invention for the production of carbon nanotubes by decomposition of a gaseous hydrocarbon on a heterogeneous catalyst in a fluidized bed by avoiding defluidization of the contents of the reactor due to carbon nanotube agglomerates which grow too large, i.e. agglomerates of which the sinking speed is above the gas speed prevailing in the reactor as a result of their size and/or particle density, by adapting the gas speed in the reactor to the diameter distributions of the catalyst added and of the product removed.

The invention thus provides a process for the production of carbon nanotubes by decomposition of a gaseous hydrocarbon on an optionally supported heterogeneous catalyst, preferably on the basis of manganese and cobalt, optionally molybdenum, in a fluidized bed reactor, characterized in that the particle sizes of catalyst and carbon nanotube agglomerates are chosen such that the ratio of gas empty tube speed to minimum fluidization speed for all the catalyst and agglomerate particles present in the fluidized bed reactor is between 1.1 and 60, and at the same time the gas speed in the reactor is set below the sinking speed of the particles, or a device for recycling discharged particles is employed.

The particle sizes of catalyst (smallest diameter which occurs) and carbon nanotube agglomerates (maximum diameter which occurs) are chosen such that the ratio of gas speed to minimum fluidization speed for all the particles present in the reactor is between 1.1 and 60, a speed ratio of between 2 and 30 being preferred, particularly preferably between 5 and 20, and at the same time the gas speed in the reactor is set below the sinking speed of the particles, or a device for recycling discharged particles, such as e.g. a cyclone, is employed. These measures serve to avoid discharge of solid for all the particles in the reactor.

Multilayered carbon nanotubes having average external diameters of from 3 to 150 nm, preferably 3 to 80 nm, and an aspect ratio of L:D>100 can be produced with the process according to the invention with a result of from 0.1 to 500 g of carbon nanotubes/g of catalyst, preferably 5 to 200 g of carbon nanotubes/g of catalyst, particularly preferably 20 to 150 g of carbon nanotubes/g of catalyst. It was possible for defluidization of the contents of the reactor due to carbon nanotube agglomerates which grow too large, such as can occur with a high yield when optimized catalysts are employed, to be reliably suppressed with the process according to the invention.

The present invention also furthermore provides the procedure for determination of the optimum gas speed range for batchwise and continuous operation in respect of the catalyst feed and the take-off of the carbon nanotube agglomerates, a distinction being made between the cases of sifting and non-sifting discharge for the latter operation.

For implementing the method according to the invention, the optimum gas speed in the reactor can be demarcated very precisely, depending on the size of the catalyst and CNT agglomerates, particle density and gas properties, with the aid of a relatively simple calculation if the catalyst introduced into the reactor is in the form of a precisely defined narrow particle size fraction.

It has been found, surprisingly, that the resulting CNT agglomerate diameter shows a clear dependency on the particle size of the catalyst added, under reaction conditions and growth times which are otherwise kept constant, the resulting agglomerate diameter thus evidently not being reduced by abrasion processes such as can usually be observed with fractally growing structures.

When calculating the optimum range of the gas speed for production of CNTs in a fluidized bed, it is assumed that the maximum resulting agglomerate diameter and the associated agglomerate density are known from preceding experiments; material data of the gas or gas mixture employed in the reaction are also assumed to be known. The minimum fluidization speed associated with a maximum agglomerate diameter, that is to say the gas speed in the reactor at which the agglomerate particle of maximum size can still just be fluidized and does not sediment downwards to the base of the reactor, can then first be calculated by means of correlations to be found in the literature. Starting from his minimum fluidization speed, an operating gas speed is then defined, which is significantly above the minimum fluidization speed but at the same time still a sufficient distance from the maximum permitted gas speed at which the agglomerate would be discharged upwards out of the reactor (this maximum speed can likewise be calculated as the sinking speed of the agglomerate by means of literature correlations). At a known density of the catalyst particles, with the operating gas speed chosen, the minimum permitted diameter of the catalyst particles can now be determined, that is to say that diameter of which the sinking speed, determined in turn by means of literature correlations, just corresponds to the operating gas speed. The calculation route described can also be used conversely to determine iteratively the optimum operating gas speed at which the resulting agglomerates can still be fluidized reliably for a given minimum catalyst diameter.

The question is: How small is the smallest catalyst particle (designated $d_{cat,min}$) which is not discharged from the reactor at a given maximum agglomerate diameter ($d_{p,max}$) and the associated operating gas speed? In detail, the calculation route for determination of the minimum catalyst diameter (or the operating gas speed at a given minimum catalyst diameter) looks as follows:

(1) The operating conditions and particle properties are first used to determine a minimum fluidization speed, $U_{mf}$, of the agglomerates (Kunii, D. and Levenspiel, O., *Fluidization Engineering*, 2nd edition, Butterworth-Heinemann, 1991, p. 70):

$$U_{mf} = \frac{\eta_G}{d_P \rho_G} \left\{ \left[ 33.7^2 + 0.0408 \cdot \frac{d_P^3 \rho_G (\rho_P - \rho_G) \cdot g}{\eta_G^2} \right]^{\frac{1}{2}} - 33.7 \right\} \quad (1)$$

In eq. (1), coefficients from the study by Wen and Yu (*AIChE J.*, 12, 610, 1966) for so-called "fine particles" are used. The symbols have the following meanings (in SI units):

$\eta_G$, dynamic viscosity of the gas mixture at the operating temperature
$\rho_G$, density of the gas mixture at the operating temperature
$d_p$, external diameter of the agglomerate, regarded in this analysis as the stated maximum diameter, $d_{p,max}$
$\rho_P$, particle density of the agglomerate
g, acceleration of gravity The minimum fluidization speed is determined for the largest agglomerate diameter to be expected $d_{p,max}$.

(2) The operating speed, $U_o$, corresponds to a multiple of $U_{mf}$ for the largest agglomerate diameter to be expected, in order to ensure adequate fluidization.

(3) The sinking speed of the catalyst particle, $U_t$, is calculated by means of the correlation of Haider and Levenspiel (cited in the abovementioned work of Kunii and Levenspiel (*Fluidization Engineering*, 2nd edition, Butterworth-Heinemann, 1991, p. 80) as follows:

$$U_t = \left( \frac{\eta_G (\rho_{cat} - \rho_G) \cdot g}{\rho_G^2} \right)^{1/3} \cdot \quad (2)$$

$$\left[ \frac{18}{d_{cat}^2} \cdot \left( \frac{\eta_G^2}{\rho_G (\rho_{cat} - \rho_G) \cdot g} \right)^{2/3} + \frac{(2.335 - 1.744 \cdot \phi_s)}{d_{cat}^{1/3}} \cdot \left( \frac{\eta_G^2}{\rho_G (\rho_{cat} - \rho_G) \cdot g} \right)^{1/6} \right]^{-1}$$

A shape factor, $\phi_s=1$, is assumed for this. $\rho_{cat}$ and $d_{cat}$ correspond to the catalyst density and the catalyst diameter respectively. The other symbols are already defined above.

(4) & (5) To characterize the minimum catalyst diameter which is not discharged from the fluidized bed reactor at the prevailing operating speed, $U_o$, that $d_{cat}$ value, designated $d_{cat,min}$, which meets the condition $U_t(d_{cat,min})=U_o$ ($d_{p,max}$) is sought with the aid of the above equation for the sinking speed.

The FIGURE shows a graph illustrating the calculation method for the process procedure according to the invention. The numbers in the FIGURE correspond to the numbered steps in the calculation route describers above.

In a particular embodiment of the process, those carbon nanotube agglomerates which have reached the envisaged maximum agglomerate diameter are removed from the reactor. This embodiment can be realized in various ways. In the case of batchwise operation of the reactor by the process procedure according to the invention in respect of catalyst feed and product removal, when the growth time has elapsed the feed of the educt gas to the reactor can be ended and the finished product removed from the reactor by means of a suitable discharge device. After addition of a new batch of fresh catalyst particles having a particle size distribution appropriate for the process procedure according to the invention, production of the next batch of carbon nanotube agglomerates can be started.

In a preferred embodiment of the process, the reactor is operated continuously in respect of catalyst feed and product discharge. In this case, the dwell time of the catalyst particles in the reactor is to be chosen such that no agglomerates of which the minimum fluidization speed is above the operating gas speed prevailing in the reactor, which would lead to undesirable deposits in the reactor, are formed In a particularly preferred embodiment of the process, the reactor which is operated continuously in respect of catalyst feed and product discharge is provided with a sifting discharge device (sifting discharge). This device ensures that only agglomerates having a diameter above a chosen maximum diameter are discharged from the reactor, and smaller particles remain in the reactor. This particularly preferred variant of the process procedure according to the invention can be realized e.g. by means of a wind sifter (e.g. zigzag sifter, spiral wind sifter, cross-flow sifter) or by means of sieving and recycling of the fine material into the reactor.

The reactor employed for carrying out the process can be made of suitable high-temperature steel or of material which is inert in respect of catalytic effects, such as e.g. graphite or also quartz glass.

The catalyst particles introduced into the fluidized bed reactor can have an external diameter in the range of from 20 µm to 1,500 µm in all the variants described above for the process according to the invention. In a preferred variant of the process according to the invention, the diameter of the catalyst particles is between 30 µm and 600 µm, in a particularly preferred variant between 30 µm and 90 µm. The particle size distribution can be measured in this context e.g. by means of laser diffraction or by sieving.

In a particular embodiment of the process, the carbon nanotubes formed are removed from the reactor by means of a sifting device which removes from the reactor only carbon nanotube agglomerates above a defined minimum diameter, in particular above 1 µm. Such a sifting device can be installed internally in the reactor or arranged externally outside the reactor and connected to this via a conveying circulation. It can be constructed e.g. from suitable sieves, or wind sifting, e.g. by means of a zigzag sifter, can take place.

The carbon nanotubes can be produced under pressures above and below atmospheric pressure. The process can be carried out under absolute pressures of from 0.05 bar to 200 bar, pressures of from 0.1 to 100 bar are preferred, and pressures of from 0.2 to 10 bar are particularly preferred.

The reactor is heated externally, and the temperature can be varied in the temperature range of from 300° C. to 1,600° C. However, it must be high enough for deposition of carbon by decomposition to take place at a sufficient speed, and should not lead to significant self-pyrolysis of the hydrocarbon in the gas phase. This would lead to a high content of amorphous carbon, which is not preferred, in the resulting material. The advantageous temperature range is between 500° C. and 800° C. A decomposition temperature of from 550° C. to 750° C. is preferred.

The catalyst can be reduced before introduction into the actual reaction chamber, can be added in an oxidic form of the chiefly catalytically active metals, or can even be added in the form of the precipitated hydroxides or carbonates Transition metals and alloys thereof such as are described extensively in the texts mentioned in the prior art are generally suitable as catalysts. Only some examples are to be mentioned here, without limiting the general nature.

It is revealed to the person skilled in the art from the prior art that a large number of combinations of metals are possible as potentially attractive catalyst materials for the production of carbon nanotubes in a fluidized bed reactor. For all these catalysts, the optimum operating point for a fluidized bed reactor can be found with the method described here.

Correct determination of the optimum operating point for a catalyst which achieves a very high yield of carbon nanotubes, based on the amount of catalyst employed, is particularly important. The method is therefore preferably employed for a catalyst which comprises manganese, cobalt and a support material, wherein cobalt and manganese are contained in amounts of 2-98 mol %, based on the content of active components in metallic form. In a further preferred manner, the method is employed for a catalyst which additionally comprises molybdenum.

Light gaseous hydrocarbons, such as aliphatics and olefins, individually or as a mixture, are preferably decomposed for the production of carbon nanotubes. What hydrocarbon is particularly suitable in respect of yield and quality of the carbon nanotubes produced depends on the choice of catalyst material. Here also, there are a large number of combinations of catalytically active metals and carbon donor gases for the production of carbon nanotubes in a fluidized bed reactor. For all these combinations of catalyst and carbon donor gas, the optimum operating point for a fluidized bed reactor can be found with the method described here.

Determination of the optimum operating point for a combination of catalyst and carbon donor gas which achieves a very high yield of carbon nanotubes, based on the amount of catalyst employed, is in turn particularly important. The method is therefore preferably employed for a catalyst which comprises manganese, cobalt and a support material, wherein cobalt and manganese are contained in amounts of 2-98 mol %, based on the content of active components in metallic form, combined with light hydrocarbons as educt gases.

Light hydrocarbons, such as aliphatics and olefins, are possible as educt gases. However, it is also possible to employ alcohols, carbon oxides, in particular CO, aromatic compounds with and without hetero atoms and functionalized hydrocarbons, such as e.g. aldehydes or ketones, as long as these are decomposed on the catalyst. Mixtures of the abovementioned hydrocarbons can also be employed. Particularly suitable educt gases are e.g. methane, is ethane, propane, butane or higher aliphatics, ethylene, propylene, butene, butadiene or higher olefins, or aromatic hydrocarbons or carbon oxides or alcohols or hydrocarbons with hetero atoms. Short- and medium-chain, that is to say having a C number of from 1 or, respectively, 2 to 10, aliphatic or olefinic hydrocarbons or mono- or dinuclear aromatic hydrocarbons are preferably employed. Aliphatics ($C_xH_{2x+2}$) and olefins ($C_xH_y$) having a C number x of x=1-4 or, respectively, 2-4 are particularly preferably employed.

In a further preferred manner, the method is employed for a catalyst which additionally comprises molybdenum, combined with the abovementioned educt gases. The addition of hydrogen to the educt gas is furthermore preferred for the said combinations of catalyst and carbon donor gas.

In carrying out the process, after the reactor has been rendered inert by means of displacement of the atmospheric oxygen by addition of an inert gas, such as e.g. nitrogen or argon, a gas mixture is passed into the apparatus at the lower end of the reactor via a suitable gas distributor. The gas mixture comprises 0-90 vol. % of hydrogen, 0-90 vol. % of an inert gas, such as e.g. nitrogen or argon, and 10-100 vol. % of a carbon donor gas, preferably 0-40% of hydrogen, 0-40% of inert gas and 40-100% of carbon donor gas, particularly preferably 0-10% of hydrogen, 0-10% of inert gas and 80-100% of carbon donor gas. Various substances are conceivable as the carbon donor, and examples have already been explained above. The gas mixture can be passed into the reactor in preheated form or without preheating, where the maximum gas preheating temperature must not exceed that temperature at which the carbon donor gas e.g. decomposes on the metallic pipelines or on the metallic gassing device. A range of the gas intake temperature of between 25° C. and 300° C. is preferred, particularly preferably between 200° C. and 300° C. In this context, the ratio of gas empty tube speed to minimum fluidization speed for all the particles present in the reactor is between 1.1 and 60. A speed ratio of between 2 and 30 is preferred, particularly preferably between 5 and 20.

Carbon nanotubes form on the catalyst, as a result of which the catalyst particles are broken up and agglomerate particles of carbon nanotubes and catalyst residues are formed.

The present invention likewise provides carbon nanotubes obtainable by the process according to the invention and uses thereof.

Because of the low catalyst content in the end product, the carbon nanotubes produced in this way can usually, as long as the application allows this, be employed without prior working up. The materials can optionally be purified, e.g. by chemical dissolving of the residues of catalyst and support, by oxidation of the contents of amorphous carbon formed in very small amounts, or by a thermal after-treatment in an inert or reactive gas. It is possible for the carbon nanotubes produced to be functionalized chemically, in order e.g. to obtain improved bonding into a matrix or to match the surface properties to the desired use in a targeted manner.

The carbon nanotubes produced by the process according to the invention are suitable for use as additives in polymers, in particular for mechanical reinforcing and for increasing the electrical conductivity. The carbon nanotubes produced can furthermore be employed as a material for storage of gas and energy, for dyeing and as flameproofing agents. Because of the good electrical conductivity, the carbon nanotubes produced according to the invention can be employed as electrode material or for the production of conductor tracks and conductive structures. It is also possible to employ the carbon nanotubes produced according to the invention as electron emitters in displays. The carbon nanotubes are preferably employed in polymer composite materials, building materials, ceramic or metal composite materials for improving the electrical or thermal conductivity and mechanical properties, for the production of conductive or mechanically reinforced coatings and composite materials, as a dyestuff, in batteries, capacitors, displays (e.g. flat screen displays) or illuminants, as a field effect transistor, as a storage medium, e.g. for hydrogen or lithium, in membranes, e.g. for the purification of gases, as a catalyst or as a support material, e.g. for catalytically active components in chemical reactions, in fuel cells, in the medical sector, e.g. as a matrix for controlling the growth of cell tissue, in the diagnostics sector, e.g. as a marker, and in chemical and physical analysis (e.g. in scanning force microscopes).

FIGURE

The FIGURE: Speed courses for characterization of $d_{cat,min}$: gas mixture of $C_2H_4$, $H_2$ and $N_2$ in the ratio of 0.4 to 0.4 to 0.2 at 650° C., 1 bar, $\rho_{cat}$=1,500 kg/m³ and $\rho_p$=400 kg/m³.

EXAMPLES

The process according to the invention is illustrated in the following with the aid of some examples, without being limited thereto.

Example 1

500 mg of a catalyst comprising the active components manganese (37 wt.-%) and cobalt (43 wt.-%) and the support materials magnesium oxide (10 wt.-%) and aluminium oxide (10 wt.-%) are introduced into a quartz glass fluidized bed reactor having an internal diameter of 49 mm. The catalyst particles have a diameter of between 80 μm and 100 μm. The reactor is heated externally to a temperature of 650° C. and, after being rendered inert, a gas mixture comprising 40 vol. % ethylene, 40 vol. % hydrogen and 20 vol. % nitrogen having a temperature of 25° C. is passed into the apparatus through a glass frit at the lower end of the reactor; the gas empty tube speed under operating conditions is 31.64 cm/s. Carbon nanotubes form on the catalyst, as a result of which the catalyst particles are broken up and agglomerate particles of carbon nanotubes and catalyst residues form. During the experiment, the temperatures in the reactor are observed at positions 1 cm, 5 cm and 15 cm above the glass frit. All the temperature measurement sites retain approximately the set value throughout the entire time of the experiment, which indicates good thorough mixing as a result of good fluidization in the reactor. The experiment is ended after 38 minutes; after the reactor has been rendered inert and cooled, 76.5 g of product, for which an average external diameter $d_{0.5}$ of 1,105 μm and a maximum external diameter $d_{0.9}$ of 1,539 μm are determined by means of laser diffraction measurement, are removed from the reactor.

Example 2

500 mg of a catalyst comprising the active components manganese (37 wt.-%) and cobalt (43 wt.-%) and the support materials magnesium oxide (10 wt.-%) and aluminium oxide (10 wt.-%) are introduced into a quartz glass fluidized bed reactor having an internal diameter of 49 mm. The catalyst particles have a diameter of between 63 μm and 80 μm, that is to say are significantly finer than in Example 1. The reactor is heated externally to a temperature of 650° C. and, after being rendered inert, a gas mixture comprising 40 vol. % ethylene, 40 vol. % hydrogen and 20 vol. % nitrogen having a temperature of 25° C. is passed into the apparatus through a glass frit at the lower end of the reactor; the gas empty tube speed under operating conditions is 31.64 canis, as in Example 1. Carbon nanotubes form on the catalyst, as a result of which the catalyst particles are broken up and agglomerate particles of carbon nanotubes and catalyst residues form. The experiment is ended after 31 minutes; after the reactor has been rendered inert and cooled, 20.8 g of product, for which an average external diameter $d_{0.5}$ of 667 μm and a maximum external diameter $d_{0.9}$ of 1,215 μm are determined by means of laser diffraction measurement, are removed from the reactor. The very small amount of product compared with Example 1 is attributed to the fact that some of the fine-particled catalyst was discharged from the reactor because the gas speed was above the sinking speed.

Example 3

500 mg of a catalyst comprising the active components manganese (37 wt.-%) and cobalt (43 wt.-%) and the support materials magnesium oxide (10 wt.-%) and aluminium oxide (10 wt.-%) are introduced into a quartz glass fluidized bed reactor having an internal diameter of 49 mm. The catalyst particles have a diameter of between 100 μm and 125 μm, that is to say are significantly coarser than in Example 1. The reactor is heated externally to a temperature of 650° C. and, after being rendered inert as in Example 1, a gas mixture comprising 40 vol. % ethylene, 40 vol. % hydrogen and 20 vol. % nitrogen having a temperature of 25° C. is passed into the apparatus through a glass frit at the lower end of the reactor; the gas empty tube speed under operating conditions is 31.64 cm/s, as in Example 1. Carbon nanotube form on the catalyst, as a result of which the catalyst particles are broken up and agglomerate particles of carbon nanotubes and catalyst residues form. During the experiment, the temperatures in the reactor are observed at positions 1 cm, 5 cm and 15 cm above the glass frit. After a duration of the experiment of approx. 15 minutes, a significant drop in temperature is observed 1 cm above the frit. This is attributed to the fact that a segregation occurs in the reactor and the largest agglomerate particles formed are deposited on the frit and are no longer fluidized, since the fluidization speed falls below their minimum fluidization speed; it is known to the person skilled in the art that the heat transfer resistance of a wall to a fixed bed is considerably higher than that from a wall into a fluidized bed, which is why in the case of an only weakly exothermic reaction such as that considered here, cooling of the non-fluidized region is to be expected if the educt gas—as is the case here—is passed cold into the reactor. The experiment is ended after 31 minutes; after the reactor has been rendered inert and cooled, 81 g of product, for which an average external diameter $d_{0.5}$ of 1,283 μm and a maximum external diameter $d_{0.9}$ of 1,625 μm are determined by means of laser diffraction measurement, are removed from the reactor.

Example 4

Calculation Example

The procedure for determination of the minimum catalyst diameter, $d_{cat,min}$, for a given maximum agglomerate diameter, $d_{p,max}$, is illustrated in the following with the aid of a calculation example. The input values listed in Tab. 1 are required for performing the calculation.

TABLE 1

| Input parameters for determination of the minimum catalyst diameter for a given maximum agglomerate diameter | |
|---|---|
| Density of the agglomerate at $d_{p,max}$: $\rho_p$ [kg/m³] | 400 |
| Density of the catalyst: $\rho_{cat}$ [kg/m³] | 1,500 |
| Maximum diameter of the agglomerate: $d_{p,max}$ [μm] | 2,000 |
| Molar contents: $X_{C2H4}$; $X_{H2}$; $X_{N2}$ [—] | 0.4; 0.4; 0.2 |

TABLE 1-continued

Input parameters for determination of the minimum catalyst diameter
for a given maximum agglomerate diameter

| | |
|---|---|
| Operating temperature: T [° C.] | 650 |
| Operating pressure: P [bar] | 1 |
| Shape factor of the catalyst particles: $\phi_s$ [—] | 1 |

To meet the condition $U_t(d_{cat,min})=U_o(d_{p,max})$ explained above, the stepwise procedure is as follows:

The minimum fluidization speed $U_{mf}$ is determined using the eq. (I) already mentioned. Using the data given in Tab. 1, the dynamic viscosity of the gas mixture, $\eta_G$, can be calculated with the aid of the component viscosities, for example by the semi-empirical formula of Wilke (see Bird, R. B., Stewart, W. E. and Lightfoot, E. N., *"Transport Phenomena"*, John Wiley, 1960, p. 24). For the gas mixture given in Table I, this results in $\eta_G=2.98\times10^{-5}$ Pas. The density of the gas mixture is determined, using the ideal gas equation, as $\rho_G=0.23$ kg/m³. All the terms on the right-hand side of eq. (1) are now known, and $U_{mf}$ is thereby determined: $U_{mf}=0.298$ m/s.

It is assumed as an experimental value that operation of the reactor at three times the value $U_{mf}$ ensures sufficiently reliable fluidization. Accordingly, $U_o(d_{p,max})=0.894$ m/s.

The last step solves the abovementioned equation, $U_t(d_{cat,min})=U_o(d_{p,max})$ iteratively, since $U_t$, $U_o$, and $(d_{p,max})$ are known, while the relationship between $U_t$ and $d_{cat,min}$ is expressed by eq. (2).

For the current example, the result by the iterative method is $d_{cat,min}=195.8$ μm. This means that all the catalyst particles below this size are discharged from the reactor. This is also illustrated with the aid of FIG. 1 by following the broken line (steps 1 to 5).

The invention claimed is:

1. Process for the production of carbon nanotubes comprising:
    decomposing a gaseous hydrocarbon on a heterogeneous catalyst in a fluidized bed reactor, wherein the catalyst is in the form of a defined particle size fraction having a particle size distribution consisting of catalyst particles with diameters between 30 μm and 600 μm;
    choosing particle sizes of catalyst and carbon nanotube agglomerates such that a ratio of gas empty tube speed to minimum fluidization speed for all the catalyst and agglomerate particles present in the fluidized bed reactor is between 1.1 and 60, and, at the same time;
    setting the gas speed in the reactor below a sinking speed of the particles, or employing a device for recycling discharged particles; and
    removing the carbon nanotubes formed from the reactor by means of a sifting device which removes from the reactor only carbon nanotube agglomerates above a defined minimum diameter.

2. Process according to claim 1, wherein the carbon nanotubes produced have an average external diameter of from 3 nm to 150 nm.

3. Process according to claim 1, wherein one or more hydrocarbons are employed, individually or as a mixture, as educts.

4. Process according to claim 3, wherein the hydrocarbons are individuals or mixtures selected from the group consisting of methane, ethane, propane, butane, pentane, hexane, ethylene, propylene, butene, butadiene, short- and medium-chain aliphatic or olefinic hydrocarbons having a C number of from 1 or, respectively, 2 to 10 or mono- or dinuclear aromatic hydrocarbons as well as aliphatics ($C_xH_{2x+2}$) and olefins ($C_xH_y$) having a C number x of x=1-4 or, respectively, 2-4.

5. Process according to claim 1, which further comprises introducing the catalyst into the reaction chamber in a form in which chief catalytically active components are in the form of oxides, in a partly or completely reduced form, or in the form of hydroxides.

\* \* \* \* \*